US008562190B2

(12) United States Patent
Ostrowski et al.

(10) Patent No.: US 8,562,190 B2

(45) Date of Patent: Oct. 22, 2013

(54) REAR LAMP ASSEMBLY

(75) Inventors: Michal Ostrowski, Tipton, MI (US); Dianna Stadtherr, Novi, MI (US); Manish Sharma, Farmington Hills, MI (US); Yijung Zhu, Windsor (CA)

(73) Assignees: Toyota Motor Engineering & Manufacturing North America, Inc., Erlanger, KY (US); North American Lighting, Inc., Paris, IL (US)

(*) Notice: Subject to any disclaimer, the term of this patent is extended or adjusted under 35 U.S.C. 154(b) by 287 days.

(21) Appl. No.: 12/981,957

(22) Filed: Dec. 30, 2010

(65) Prior Publication Data

US 2012/0170296 A1 Jul. 5, 2012

(51) Int. Cl.
*B60Q 1/04* (2006.01)

(52) U.S. Cl.
USPC ............................ 362/507; 362/518; 362/297

(58) Field of Classification Search
USPC ......... 362/297, 343, 346, 350, 354, 514, 518, 362/541–545
See application file for complete search history.

(56) References Cited

U.S. PATENT DOCUMENTS

| | | | | |
|---|---|---|---|---|
| 4,351,018 | A * | 9/1982 | Fratty | 362/215 |
| 6,086,231 | A | 7/2000 | Kenjo et al. | |
| 6,357,902 | B1 | 3/2002 | Horowitz | |
| 6,382,822 | B1 * | 5/2002 | Maekawa et al. | 362/522 |
| 7,086,765 | B2 | 8/2006 | Wehner | |
| 7,135,824 | B2 | 11/2006 | Lys et al. | |
| 2003/0164666 | A1 | 9/2003 | Crunk | |

FOREIGN PATENT DOCUMENTS

| | | | |
|---|---|---|---|
| FR | 2477995 | A * | 9/1981 |

* cited by examiner

*Primary Examiner* — Hargobind S Sawhney
(74) *Attorney, Agent, or Firm* — Gifford, Krass, Sprinkle, Anderson & Citkowski, P.C.

(57) ABSTRACT

A rear automotive lamp assembly is provided replicating the appearance of a plurality of distinct illumination sources, such as light emitting diodes. The lamp assembly having a light source, at least one reflector, the reflectors having reflective surfaces, the reflective surfaces operable to reflect light from the light source. The reflectors spaced apart and oriented such that light rays from the light source are incident to each of the reflective surfaces are reflected towards a viewing direction. A shield further disposed between the light source and the reflective surface of the reflector. The shield including a plurality of open sections or cutouts thereby allowing a generally collimated light beam from the light source to shine on the reflective surface such that each of the reflective surfaces of the at least one reflector appears as a distinct illumination source from the viewing direction. The openings vary in size and dimension along the length of the shield.

20 Claims, 10 Drawing Sheets

(SECTION A-A)

(SECTION B-B)

REAR LAMP ASSEMBLY

FIELD OF THE INVENTION

This invention relates generally to automotive lamp assemblies. In particular, this invention relates to a rear automotive lamp assembly replicating the appearance of a plurality of distinct illumination sources.

BACKGROUND OF THE INVENTION

For decades, conventional exterior vehicle lighting has relied on light sources such as incandescent or halogen lamps, for example. Relatively recent advances in technology have allowed vehicle lamps to incorporate other light sources into vehicle lighting applications. Some vehicle lamps have recently been designed to incorporate light emitting elements, such as light emitting diodes (LEDs), for use in exterior vehicle lamps. While the use of LEDs provides certain benefits in some lighting applications, the use of LEDs may be more expensive as multiple light sources must typically be used in order to meet the photometric requirements of a vehicle lamp.

Although the implementation of LEDs in rear automotive lamp assemblies is highly desirable, the high cost of LEDs prevents engineers and designers from implementing the LEDs into rear automotive lamp assemblies. In addition to these functional and photometric requirements of vehicle lamps, vehicle lighting design has evolved to include aesthetic and important design features that define the style of the lamp and even a vehicle. Vehicle manufacturers may desire to have a lamp that looks like it has LEDs while still maintaining the traditional cost and benefits of an incandescent or halogen lamp while having fewer light sources.

Certain known methods of designing a vehicle lamp with an LED-look require the use of lens optics, either on an inner lens or the outer lens. The addition of lens optics or having an inner lens component to the lamp may increase cost, and styling requirements of vehicle manufactures sometimes dictate that the lamp has a smooth clear lens so that the customers can easily see into the lamp. However, the highly desirable look of LEDs in rear automotive lamp assemblies is still in high demand. Accordingly, it would be advantageous to provide an automotive lamp assembly providing the look of a plurality of LEDs at a significantly decreased cost.

SUMMARY OF THE INVENTION

A rear automotive lamp assembly is provided having a plurality of pointed light reflection points. An automotive lamp assembly replicating the appearance of a plurality of light emitting diodes, the lamp assembly having a light source, at least one reflector, the reflectors having reflective surfaces, the reflective surfaces operable to reflect light from the light source. The reflectors spaced apart and oriented such that light rays from the light source are incident to each of the reflective surfaces are reflected towards a viewing direction. A shield further disposed between the light source and the reflective surface of the reflector. The shield including a plurality of open sections thereby allowing a generally collimated light beam from the light source to shine on the reflective surface such that each of the reflective surfaces of the at least one reflector appears as a distinct illumination source from the viewing direction.

BRIEF DESCRIPTION OF THE DRAWINGS

The above and other features and objects of the invention will be better understood from the following detailed description of the typical embodiments illustrated in the accompanying drawings, in which:

FIG. 10A shows a computer simulated model depicting the front view of the lamp according to an embodiment of the present invention showing the distinct illuminated light sources observed from the viewing direction when the light source of the vehicle lamp is on;

FIG. 10B depicts a prototype model according to an embodiment of the present invention showing the distinct illuminated light sources observed from the viewing direction when the light source of the vehicle lamp is on;

DETAILED DESCRIPTION OF THE PREFERRED EMBODIMENTS

Figure 1:
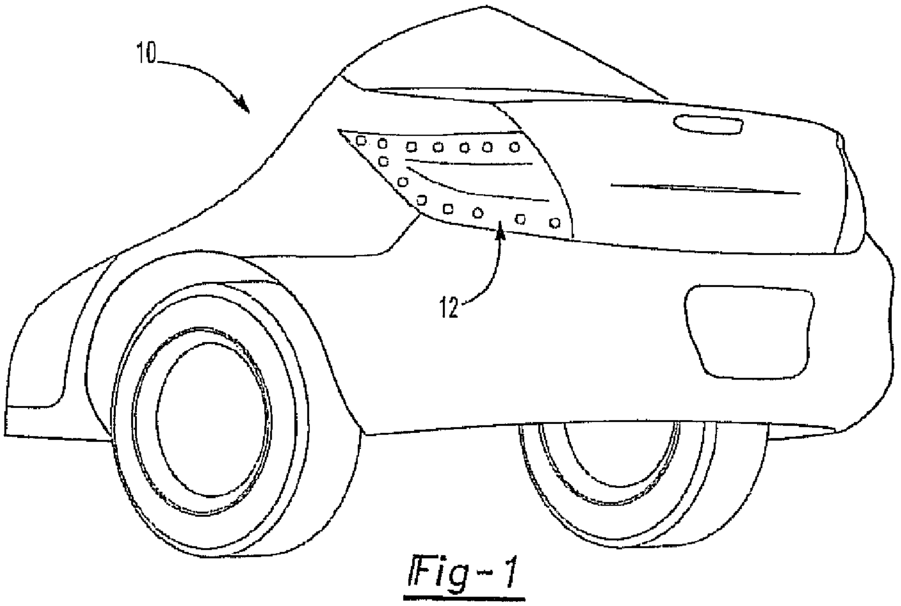
FIG. 1 is a perspective view of a vehicle having a rear lamp assembly including the ability of replicating the look of a plurality of distinct illumination sources.
Figure 2:
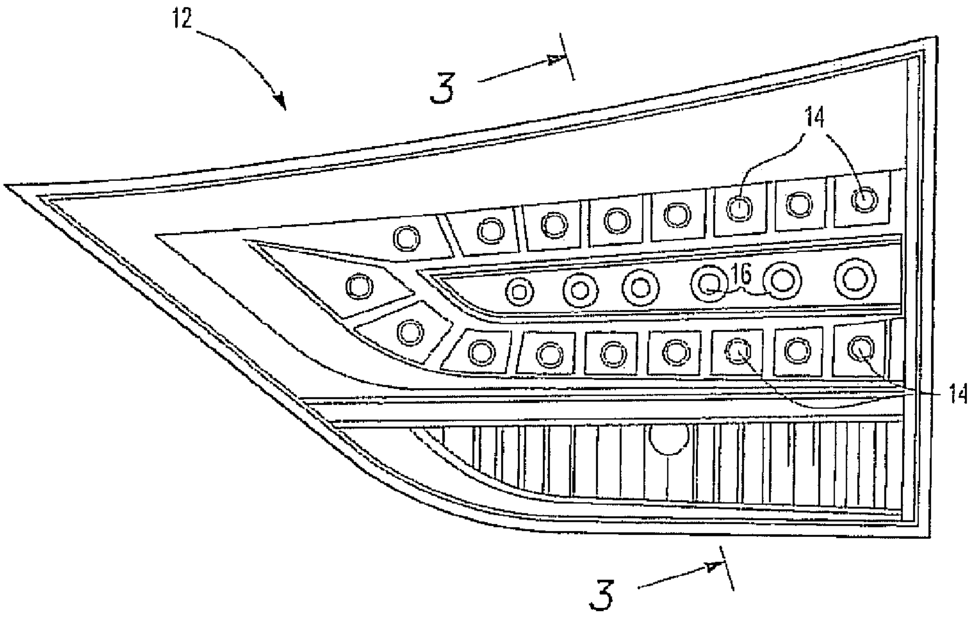
FIG. 2 is a frontal view of a rear automotive lamp assembly including the ability of replicating the look of a plurality of distinct illumination sources.

The automotive lamp assembly 12 replicates the appearance of a plurality of LEDs. The automotive lamp assembly 12 does not include the use of LEDs. The automotive lamp assembly 12 provides for a plurality of LED light reflection points 14. The automotive lamp assembly further includes decorative element 16.

The exemplary lamp assembly 12 may be a tail lamp which may be provided on the rear of a vehicle. The lamp assembly 12 may be provided on the vehicle body, or the lamp may be disposed on another surface of the vehicle, such as the trunk or deck lid of the vehicle. Moreover, the lamp may be any type of lamp including, but not limited to, a signal or reverse lamp, not just the exemplary tail lamp as illustrated.

The lamp assembly 12 includes a housing 26 which may be enclosed by an outer lens 60. The lamp assembly 12 may include a plurality of reflectors 30 and spaced apart by respective connecting surfaces 24 which may be disposed or formed on the housing 26. In other embodiments, some or all of the reflectors 30 may be disposed on a component that is placed in the housing 26, such as the shield 40, discussed further below. In the front view of the lamp assembly 12 when viewed from the rear of the vehicle, a light source 50 is hidden in the viewing directions. The vehicle lamp assembly 12 has a primary viewing direction from which the light from the light source 50 is designed to be viewed from the rear of the vehicle. As will be discussed further below, while the light source 50 is not directly viewable from the primary viewing direction, light from the light source 50 may be reflected towards the viewing direction and viewed indirectly in the viewing direction. In the illustrated embodiment of the present invention, this primary viewing direction extends generally at a 10 degree cone angle from the optical axis Ax such that the cone generally extends +/−5 degrees around the optical axis Ax.

Use of the light source 50 in place of a plurality of LEDs significantly decreases cost of the automotive lamp assembly 12. The reflectors 30 may appear as distinct light sources or LEDs when the reflectors 30 are illuminated by the hidden light source 50. Although the light source 50 is generally hidden from view in the three-dimensional front view of the lamp assembly 12, the optical axis of the bulb Ax is shown. The light source 50 may be an incandescent bulb having a filament 50*a* or may be any other light source 50 suitable for the application. Additionally, the lamp assembly 12 may have more than one light source. For example, in the instance of a stop lamp, the light source may be a bulb which has two filaments providing a first and second light source with different light output intensities. There may also be two separate light sources, one for the tail lamp function and one for the stop lamp function. A separate light source or separate bulb may also be provided for alternate function, such as signal or reverse functions, for example.

The vehicle lamp 12 has a primary viewing direction from which the light may be viewed from the rear of the vehicle. The primary viewing region may be at a distance of approximately ten feet from the lamp assembly 12 but may be at a greater distance up to fifty feet or more. In the illustrated embodiment of the present invention, this primary viewing direction extends generally at a 10 degree cone angle from the optical axis Ax such that the cone generally extends +/−5 degrees around the optical axis Ax. However, this primary viewing direction may be different for different photometric standards or different lamp designs/function. In the primary viewing direction, the reflectors 30 are configured to appear as distinct illuminated light sources or look like discrete LEDs. The lamp assembly 12 may have at least one secondary viewing region. In the illustrated embodiment of the present invention, this secondary viewing direction extends generally at a 20 degree cone angle from the optical axis Ax, although this secondary viewing direction may be different for different photometric standards or different lamp designs/function. The secondary viewing area may be beyond 25 degrees and up to 85 degrees from the optical axis Ax. It is also contemplated that the secondary viewing region may have a different optical axis. While the connecting surfaces 24 are designed to appear dark or dim in the primary viewing region, the connecting surfaces 24 may be configured to scatter or reflect light to the secondary viewing region in order to meet photometric standards or for style effects, for example.

The primary viewing direction may be different for different standards or different lamp designs or function depending on where the light is designed to be viewed and the how the human eye can perceive light from that location. For example, the primary viewing angle for a turn-signal function may be +/−20 degrees from the optical Ax. A side-marker function may have a primary viewing angle that extends to 45 degrees around the optical axis Ax. It should also be noted, that the different functions, while also having a different viewing angle, may have a different optical axis. For example, the optical axis of the side-marker may be generally parallel to the rear of a vehicle, while the optical axis of a tail lamp is generally perpendicular to the rear of the vehicle.

In the primary viewing direction, the reflectors 30 are configured to reflect light that appears as distinct illuminated light sources or look like discrete LEDs. A LED is a directional light source where light may be emitted in a direction perpendicular to the emitting surface of the semiconductor chip of the LED. The radiation pattern of an LED may be a generally collimated beam where emitted light may be a generally focused narrow directional radiation pattern. A collimated light source may produce rays that are generally parallel, and have a narrow beam spread. Some packages for LEDs include plastic lenses to spread the light for a greater angle of visibility so that the light is spread from 5 degrees to 25 degrees or even a greater spread for advanced LED optic designs. In contrast, traditional lighting sources, such as incandescent bulbs, may be omni-directional light sources where light is emitted in all directions in generally 360 degrees.

The shield 40 impedes light from the light source 50 from being further projected toward the primary viewing direction of the lamp assembly 12, however, the shield 40 does not prevent light from being projected towards the reflectors 30. To allow light to be projected towards the reflectors 30, the shield 40 may include cut-out regions or openings 42. The cut-out regions or openings 42 may also be provided by in housing 26 in cooperation with the shield 40. The cut-out or openings 42 regions will be discussed further below.

The reflectors 30 may be arranged in an array around the light source 50. The reflectors 30 may be spaced apart but connected by a connecting surface 24. In certain embodiments, the connecting surface 24 may include features for aesthetic or style purposes. For example, the connecting surface 24 may be styled to look like a reflector in an unlit-condition. However, the connecting surface 24 is preferably configured such that it does not reflect a substantial amount of light to the primary viewing direction. By not reflecting a substantial amount of light to the primary viewing region, the connecting surfaces 24 appear dark or dim or have less intensity compared to the reflectors 30 in the primary viewing region. For instance, in one embodiment of the invention, the reflectors 30 may reflect 80-90% of light from the light source 50 to the primary viewing region. Instead, the connecting surface 24 may be designed to reflect or scatter light from the light source 50 away from the primary viewing region or to a secondary viewing region. The connecting surface 24 may also be configured to absorb incident light.

In one embodiment of the invention, the reflective surfaces 32 may have surface areas that vary from 0.6 $cm^2$ to 1.3 $cm^2$. However, the dimension of the reflective surface 32 may be significantly larger or smaller depending on the appearance and style design of the lamp assembly 12, as well as the photometric requirements. According to another aspect of the present invention, in order to maintain the LED-look of the reflector surfaces, the surface area of the reflective surface 32 may range between 0.1 $cm^2$ and 7 $cm^2$. Further, the reflective surfaces 32 may become generally larger as the reflective surface 32 is located further from the optical axis Ax. This may help provide relatively uniform optical intensity of each reflector 30 in the primary viewing direction.

The housing 26 is typically injection molded with a rigid plastic material. The housing may be injection molded to include the reflectors 30 and connecting surfaces 24 and any other aesthetic design features of the lamp assembly 12. The reflective surfaces 32 may be coated with a reflective coating such as aluminum, nickel chrome, argent paint, metalized coating or any other reflective coating which is suitable. The reflectivity of a surface is a percentage of how much incident light gets reflected relative to a perfectly reflective surface where 100% of the incident light gets reflected. It is contemplated that the reflective surfaces 32 of an embodiment of the present invention have 80% to 90% reflectivity. However, the reflectivity of the reflective surfaces 32 may be as low as 50% on the light requirement, or material used. In an embodiment of the present invention, the connecting surfaces 24 may have a lower reflectivity than the reflective surfaces 32 in order to increase the illuminance ratio, as discussed below.

In an embodiment of the present invention, the connecting surface 24 may have the same reflectivity as the reflectors 30; however the connecting surface 24 may direct light to a different direction by scattering any light incident on the connecting surface 24 to a secondary viewing region a different direction than the primary viewing direction. Alternatively, the connecting surfaces 24 may reflect light to the primary viewing area yet have a reflectivity that is less than the reflectivity of the reflective surfaces 32. For example, the reflective surfaces 32 may have a reflectivity of 50-100% whereas the connecting surfaces 24 may have a reflectivity of 7-40%. The difference in reflectivity between the reflective surfaces 32 and the connecting surface 24 may be at least 50% in order for the connecting surfaces 24 to appear dim or dark compared to the reflective surfaces 32. The connecting surfaces 24 may be masked so that they are not coated with a reflective coating, or coated with a non-reflective coating. Also, the connecting surfaces 24 may absorb light and therefore prevent light from being reflected to the primary viewing region. Depending on photometric requirements of the lamp assembly 12, the amount of light reflected to the primary region or the secondary regions by the reflectors 30 and the connecting surfaces 24 may vary.

The light source 50 may be located in the lamp housing 26. In an embodiment of the invention illustrated in FIG. 3, the light source 50 may be located on a back surface of the housing 26; however, the light source 50 may also be located on a bottom, top or side surface of the housing 26.

Figure 8:
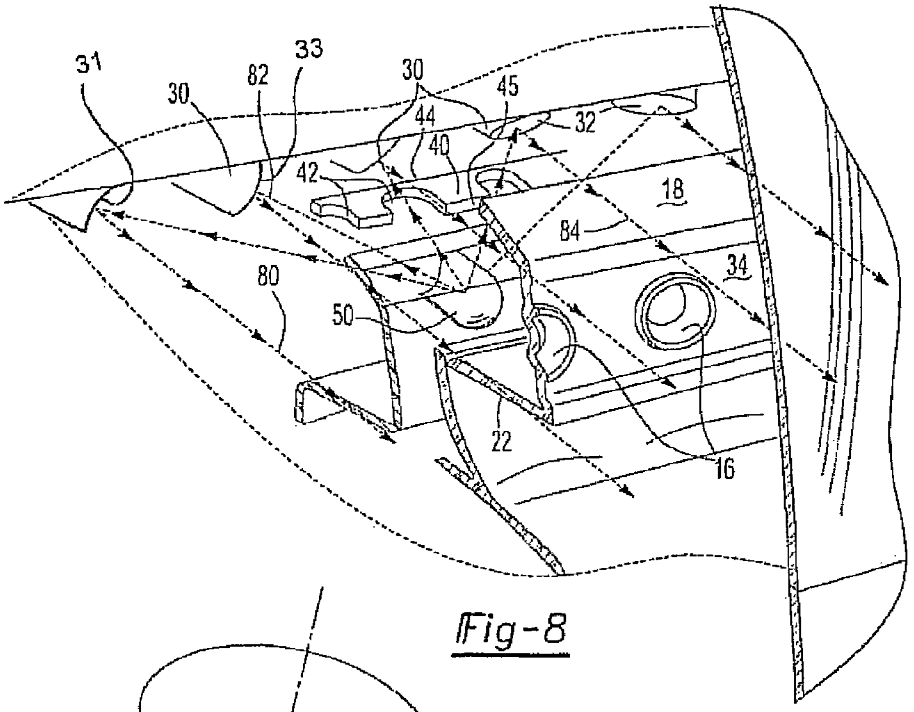
FIG. 8 is a perspective view of an assembled automotive rear lamp assembly including the ability of replicating the look of a plurality of distinct illumination sources.

In at least the illustrated embodiments, each of the reflectors 30 are raised sections 20 which may also look like LEDs when the lamp is unlit. The raised sections 20 may be protrusions from the lamp housing 26 so that the raised sections 20 may be prominent from the connecting surfaces 24 and may extend toward the outer lens 60. The raised sections 20 may be cylindrical shaped. The reflectors 30 may be formed where a parabolic reference surface or plane, such as P1, P2 or P3, intersects the cylinder to create the reflective surface 32. The reference surface may also be an elliptical plane which intersects the cylindrical reflectors. By definition, the intersection of the cylindrical raised sections 20 with the parabolic or elliptical reference surface creates an elliptical boundary-shaped reflective surface 32 on each of the reflectors 30. Moreover, it is contemplated that the reflectors 30 may be any geometric shape such as a triangular or square-shaped raised section, the parabolic or elliptical reference section thereby forming a reflective surface 32 such as a triangle or trapezoid respectively. The parabolic surfaces 31, 33 of the reflectors 30 are further shown in FIG. 8.

The light source 50 may be covered with a bulb cover or inner lens 62. While the inner lens 62 may be transparent and may not have any optical characteristics, the inner lens 62 may be colored to provide a colored light to the vehicle lamp assembly 12. As in the present example where the vehicle lamp assembly 12 is a tail lamp, the inner lens 62 may be colored red to provide the red light of a tail lamp. It is contemplated that the inner lens 62 may be also be amber for use in a signal lamp, or any other color required for lamp functions.

The openings 42 of the shield 40 abut a first edge 45 of the shield 40. The openings 42 of the shield 40 are generally semicircular. In an alternative embodiment, the openings 42 are apertures not abutting a first end 45 of the shield 40, nor do they abut any other edge. In yet another alternative embodiment, the openings 42 have a generally rectangular, square, or other geometrical shape. The shield 40 may be disposed between the light source 50 and the outer lens 60. While the shield 40 may be designed to block direct light and keep the light source 50 hidden from view in the primary viewing region, shield 40 may be configured to allow some light from the light source to be projected towards the reflectors 30.

The shield 40 may be distinctive from a bulb shield employed on many headlamps when a bulb shield, for example, is designed to help prevent low-beam light from blinding on coming drivers, yet still allow a sufficient amount of light to be projected on the road. Where a bulb shield is relatively small compared to the relatively large surface area of the surrounding reflectors, the shield 40 may be relatively large compared to the surface area of the reflectors 30. The shield 40 may be sufficiently sized so that the area covered by the shield 40 may appear dark and may mask direct light from light source 50 in the primary viewing direction of the lamp assembly 12. The shield 40 may also be sufficiently sized so that the shield 40 hides the light source 50 from the primary viewing direction. While the shield 40 may hide the light source 50 and prevent any direct light from being emitted toward the primary viewing direction, the shield 40 may allow light to be projected toward the reflectors so that indirect light which is reflected from the reflectors 30 and their corresponding reflective surfaces 32 is visible in the primary viewing direction.

The shield 40 may be formed so that it encloses the light source 50 with only cut-out regions or openings 42 configured to selectively allow light essentially to the reflectors 30 while essentially blocking direct light to the primary viewing region. The shield 40 may be formed to hide the light source 50 with a forward shield face 34 and side shield flanges 36. The shield face 34 may include styling features since the shield face 34 is generally visible outside the lamp assembly 12 and visible in the primary viewing direction. The styling features may include optical characteristics, but alternatively the styling features may be purely for aesthetic purposes.

In one embodiment of the invention, the shield 40 may be elongate where the forward shield face is generally perpendicular to the optical axis Ax. The shield 40 may include side flanges 36 which may extend from the shield face 34 in order to further enclose the light source 50. The side flanges 36 may be transverse to the front face 34 and may be oriented generally parallel to the optical axis Ax. The side flanges 36 may include cut-out regions or openings 42 to selectively allow light from the light source 50 to be projected toward the reflectors 30, while blocking light emitted in other directions or toward the viewing region. Although the back side of the shield 40 is not shown in FIG. 3, the back side of the shield 40 may have optical characteristics that further direct light to the reflectors 30 or prevent light from becoming incident on the connecting surfaces 24. The shield 40 includes decorative elements 16 and an secondary blocking region 18 connected to the shield 40 to further block stray light from the light source 50. The shield 40 includes secondary blocking region 22 connected to the shield 40 operable to block stray light from the light source 50.

A bulb cap, or inner lens 62 is disposed between the light source 50 and the reflector 30 having a reflective surface 32. The inner lens 62 is provided as a filter to filter light from the incandescent light bulb 52 before it reaches the reflective surface 32. The inner lens 62 is transparent or translucent and clear. In an alternative embodiment, the inner lens 62 is transparent or translucent and red or amber. Directional arrows 70 depict light exiting the incandescent light bulb through the inner lens 62 and reflecting off of the reflective surface 32 of the reflector 30. The inner lens 62 is made of a resin, plastic, or polymer material having highly resilient qualities.

The outer lens 60 is provided on the automotive lamp assembly 12 as an environmental barrier covering the reflective surface 32, the light source 50, the inner lens 62, and the solid shield 20. The outer lens 60 protects the elements of the automotive lamp assembly 12 from environmental elements such as wind, rain, or sun. The outer lens 60 of the automotive lamp assembly 12 is made of a resin, plastic, or polymer-like material having highly resilient qualities. The outer lens 60 is transparent or translucent and clear. The outer lens 60 may also be referred to as a lens. In the present embodiment of the invention shown here, the outer lens 60 may be transparent but not have any optical characteristics. The outer lens 60 may be used to enclose the lamp and prevent damage and debris from getting into the lamp. The outer lens 60 may be colored to provide functional characteristics. For example, the outer lens 60 may be red or amber for a tail lamp or signal lamp respectively. It is also contemplated that the reflectors 30 may be combined with the outer lens 60 which acts as a lens and has lens optic characteristics.

As shown by arrows 70, light exits the light source 50 through the inner lens 62, reflects onto the reflective surface 32 and out through the outer lens 60. In yet further detail, light arrows 70 depict light emitting from the light source 50, through the inner lens 62, through the opening or cutout 42 of the shield 40, reflecting onto the reflective surface 32 of the reflector 30 and through the outer lens 60 and duplicating the appearance of an LED. Various light arrows 80, 82, 84 depict light emitting from the light source 50 through the openings 42 of the shield 40, onto the reflective surface 32 of the reflector 30, thereby duplicating the look of an LED.

Figure 6:
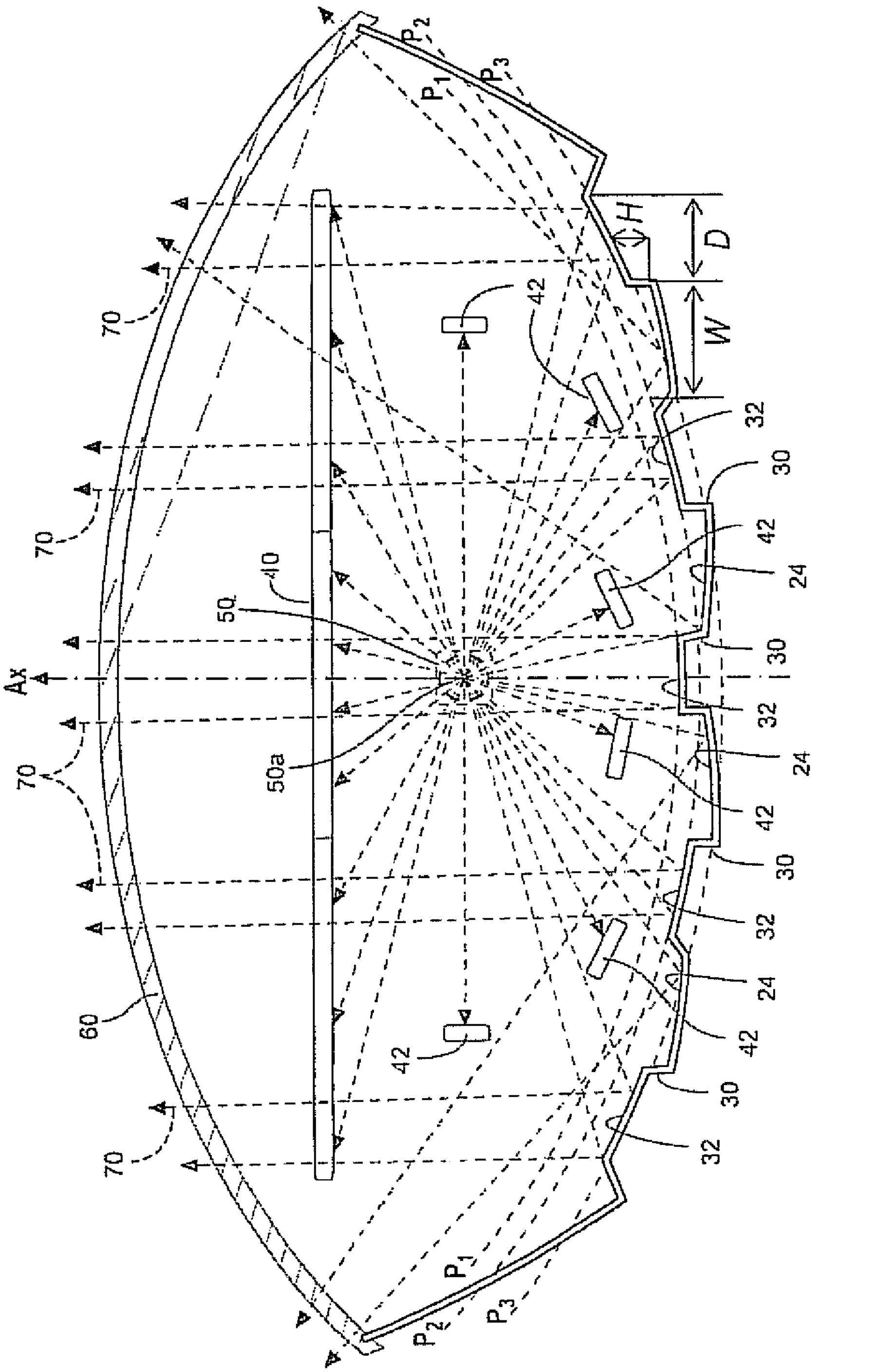
FIG. 6 illustrates a simplified sectional view of section A-A from FIG. 3 shown from the top view and illustrating a ray trace.

FIG. 6 illustrates the light ray traces from the light source 50, and more specifically, the bulb filament 50*a* of the light source 50. FIG. 6 further illustrates an embodiment of the present invention where direct light from the light source 50 may be blocked by the shield 40, and where only indirect light projected from the reflectors 30 may be visible in the primary viewing direction.

The reflectors 30 may have at least one reflective surface 32. The reflective surface 32 may be formed with a parabolic or elliptical surface as a reference surface. The reflective surface 32 may be made up of a compound curved surface which is formed with the rotational parabolas or ellipses P1, P2 and P3 as reference surfaces in which the optical axis Ax is employed as a common axial line. The light source 50 may be located on the optical axis Ax. Further, the light source 50, and more specifically, the filament 50*a*, may be the common focal point of the reference parabolas or ellipses P1, P2 and P3, whereas the focal lengths are different. Alternatively, the light source 50 may be located at location where the optical axes of the rotational parabolas or ellipses coincide. Also, the focal lengths of the reference parabolas or ellipses P1, P2, and P3 may be gradually smaller as the reflective surfaces 32 are closer to the optical axis Ax.

Where the reflective surfaces 32 are formed by reference surfaces with a generally common optical Ax, the reflected collimated light beams 40 may similarly be reflected parallel to the optical axis Ax toward the primary viewing direction. The reflective surfaces 32 of the reflectors 30 may appear as individual lights where the reflectors 30 are spaced apart by connecting surfaces 24 and the connecting surfaces 24 do not reflect light to the primary viewing direction. The connecting surfaces 24 may reflect light in a different direction. As such, the connecting surfaces 24 may not be reference parabolic surfaces. Alternatively, the connecting surfaces 24 may have an optical axis which is not generally coincident with the optical axis Ax of the reflective surfaces 32.

It is further contemplated that a light source 50 may be located slightly away from the common focal point. This may make the reflectors 30 appear slightly out of focus; however this may be a desired styling or functional effect. For example, in a stop lamp, the light source 50 may have two filaments 50*a* where at least one of the filaments is located slightly away from the focal points. Alternatively, the lamp assembly 12 may have more than one light source 50, with each light source 50 being located substantially at the focal point of a corresponding array of reflectors 30.

Light from the bulb filament 50*a* which is incident to the reflective surfaces 32 is reflected towards the primary viewing direction in generally collimated light beams 40. However, light which may be incident to the connecting surface 24 may be reflected away from the primary viewing direction and may be scattered or diffused to a secondary direction or even absorbed. A plurality of collimated light arrows 70 from the reflective surfaces 32 is directed generally parallel to the optical axis Ax where it may be viewed in the primary viewing direction. Conversely, it is contemplated that any light incident to the connecting surfaces 24 is reflected in a direction not parallel to the optical axis Ax and is therefore scattered away from the primary viewing area. Alternatively, the connecting surface 24 may be non-reflective or configured to have relatively low reflectivity.

The difference in the amount of light which is incident to the reflective surfaces 32 and connecting surfaces 24 may be measured in illuminance. Illuminance is the density of light incident on a surface and is measured in lux (lumens/$m^2$). In an embodiment of the present invention, the illuminance of the reflective surfaces 32 may be approximately 5 lux where the illuminance of a portion of the connecting surfaces 24 may only be 2 lux. In another embodiment of the present invention, the illuminance the connecting surfaces 24 may only be 0.05 lux or even approaching zero illuminance so that the ratio of illuminance is up to 100:1 or more. In another embodiment of the present invention, the reflectivity of the reflective surfaces 32 may be higher than the reflectivity of the connecting surfaces 24 in order to increase the illuminance ratio.

FIG. 6 further illustrates the geometric and dimensional characteristics of a lamp assembly 12 of an embodiment of the present invention. The reflectors 30 may have a height H and a width D of the reflective surface 32. The reflectors 30 are spaced apart from each other so as to appear as distinct light sources. The reflectors 30 are spaced apart by connecting surfaces 24. Likewise, the connecting surfaces 24 may have a width W.

The dimension D of the reflective surface 32 may vary from reflector to reflector. In an embodiment of the present invention, the width of the reflective surface 32 may vary from 8 mm to 16 mm. However, the width, D of the reflective surface 32 may be significantly larger or smaller depending on the appearance and style design of the lamp assembly 12, as well as the photometric requirements. Likewise, the reflectors have a height H which may vary from reflector to reflector. The height, H is the average distance the reflector extends from the connecting surface 24 at approximately the center of the reflective surface 32. In an embodiment of the present invention, the average height of the reflectors may vary from 0.75 mm to 3 mm. However, the height of the reflectors 30 may be significantly higher or lower depending on the appearance and style design of the lamp assembly 12, as well as the photometric requirements and packaging constraints. The width, D is the actual width of the reflectors. In the projected front view, the width may be different because of the angle that the reflective surfaces 32 are oriented at along the reference parabolic or elliptical curves. As such, in an embodiment of the present invention, the diameter of the reflectors 30 in the front view may vary from 8 mm to 12 mm.

The collimated light beams 70 may include a slight spread of light. The reflective surfaces 32 may also include a curvature portion such as a concave, convex, or conical portion, designed such that the collimated light beams shown by arrows 70 are spread slightly. In an embodiment of the present invention the curvature portions may be configured for a 10 degree primary viewing angle away from the optical axis Ax such that the collimated light beams may extends +/−5 degrees or more around the optical axis Ax. This may improve the aesthetics such that the collimated light beams shown by arrows 70 from the reflective surfaces 32 would be visible to a wider range of viewing angles. Varying the radius of the curvature portion may also help provide relatively uniform optical intensity of each reflector 30 in the primary viewing region. The radius R of the curvature portion has a vertical (Rv) and horizontal (Rh) component which may varied independently to further optimize the appearance of the reflectors 30. Variation of the radius R may also help balance the appearance of the reflectors 30 in an unlit condition. By variation of the radius factors Rv and Rh, this may allow the reflectors 30 and reflective surfaces 32 to have more uniform brightness when viewed from the primary viewing direction, even though the reflectors 30 are located at substantially different distances from the light source 50 and have different heights and varying surface areas. For example, as the Rh or Rv decreases, the light spread increases and both the brightness and lit area on the reflective surface 32 decreases.

In order for the human eye to perceive and distinguish the reflectors 30 as distinct light sources, several photometric qualities may be considered in the design of a lamp to produce a quality LED-look. For example, illuminance (I) is the measure of light incident on a surface and is measured in lux (lumens/$m^2$). In order for a person to perceive the reflectors 30 as distinct light sources, the human eye must be able to differentiate the reflectors 30 from the connecting surfaces 24 around the reflector 30. The difference in the amount of light which is incident to the reflective surfaces 32 and connecting surfaces 24 may be measured in illuminance. Illuminance of a lamp assembly 12 may be measured with a computer simulated lit appearance plot, such as in FIG. 10A. In an embodiment of the present invention, the illuminance of the reflective surfaces 32 may be approximately 5 lux where the illuminance of the connecting surfaces 24 may only be 2 lux. In another embodiment of the present invention, the illuminance the connecting surfaces 24 may only be 0.05 lux or even approaching zero illuminance so that the ratio of illuminance is up to 100:1 or more.

The human eye's ability to discriminate the quality of a light source to is also sensitive to contrast. Contrast is the difference in visual properties that makes an object distinguishable from other objects and the background. Contrast is determined by the difference in the color and brightness of the object and other objects within the same field of view. Contrast ratio is the ratio of the luminance, or amount of light per unit area in a given direction. Luminance is a measure of how bright an object will appear. As such, contrast ratio may be dependant on the surface area of the light sources. For example, a relatively small surface may look extremely bright in contrast to a large surface which is has a relatively low luminance. As such, the ability to distinguish the reflective surfaces 32 as distinct light sources may be affected by the relative surface areas of the reflective surfaces 32 in comparison to the surface area of the connecting surface 24.

In one embodiment of the present invention, the connecting surfaces 24, or the area between the reflectors 30, are designed to appear dark or dim in the primary viewing direction. For example, the connecting surfaces 24 may appear dark in a 10 degree viewing angle away from the optical axis Ax. The surface area of the connecting surfaces 24 may be 2.9 $cm^2$ to 9.7 $cm^2$. Whereas, the surface area of the reflective surfaces 32 may range from 0.6 $cm^2$ to 1.3 $cm^2$. The surface area of the connecting surfaces 24 and reflective surfaces 32 may vary in size depending on photometric requirements and design considerations. In one embodiment of the invention, the surface area of the connecting surface 24 may be at least four times larger than the surface area of the adjacent reflective surface 32. In another embodiment of the present invention, the surface area of the connecting surface 24 may be at more than seven times larger than the area of the adjacent reflective surface 32. The ratio of connecting surface 24 areas to reflective surface area 28 may increase as the reflective surface 32 and connecting surface 24 are located further from the light source. In another embodiment of the invention, the contrast ratio between the reflective surfaces 32, which appear bright, and the connecting surfaces 24, which appear dim or dark, may have a light-to-dark contrast ratio of 5:1 or 7:1 up to 25:1 or more in the primary viewing direction.

In general, the contrast, as defined by the difference between the luminance of the brightest reflective area compared to that of the dimmest reflective area, within the given field of view, may only be discernable to the viewer if the surface area between the brightest and the dimmest reflective areas is substantial enough to be perceived by the human eye. Although contrast sensitivities will vary between individuals, according to one aspect of the present invention, in order to perceive the brightest reflective area of the reflective surfaces 32 as a "LED" adjacent to a dim or dark reflective area of the adjacent connecting surface 24, the following guideline may be considered: $(I_{max}-I_{min})/(I_{max}+I_{min})$ greater than or equal to 0.66, where $I_{max}$ is the illuminance of a reflective surface 32 and $I_{min}$ is the illuminance of an adjacent connecting surface 24 as measured in lux along the surface of a lamp. Moreover, the surface area of the connecting surface 24 may be equal or greater than the surface area of the reflective surface 32, so that the two distinct surfaces are discernable to the viewer.

The human eye's ability to discriminate the quality of a light source may also be affected by visual acuity. Visual acuity measures how much the human eye can differentiate one object from another in terms of visual angles. Acuity is a measure of the ability to differentiate one object from another object separated by a distance. As such, the reflectors 30 may be spaced apart by a distance great enough to differentiate one reflector 30 from another. In one embodiment of the present invention, the reflectors 30 may be spaced apart by the width W of a connecting surface 24, where the width W of the connecting surfaces 24 may be at least equal to the dimension D of an adjacent reflective surface 32. In an embodiment of the present invention, the distance W between the reflective surfaces 32 may vary between 15 mm and 37 mm. In another embodiment of the present invention, the distance W between the reflectors 30 may be three to four times the width D of the reflective surface in order make the reflectors 30 appear as individual LEDs or distinct light sources. However, the distance W may be wider depending on the appearance and style design of the lamp assembly 12, as well as the photometric requirements and packaging constraints.

Figure 3:
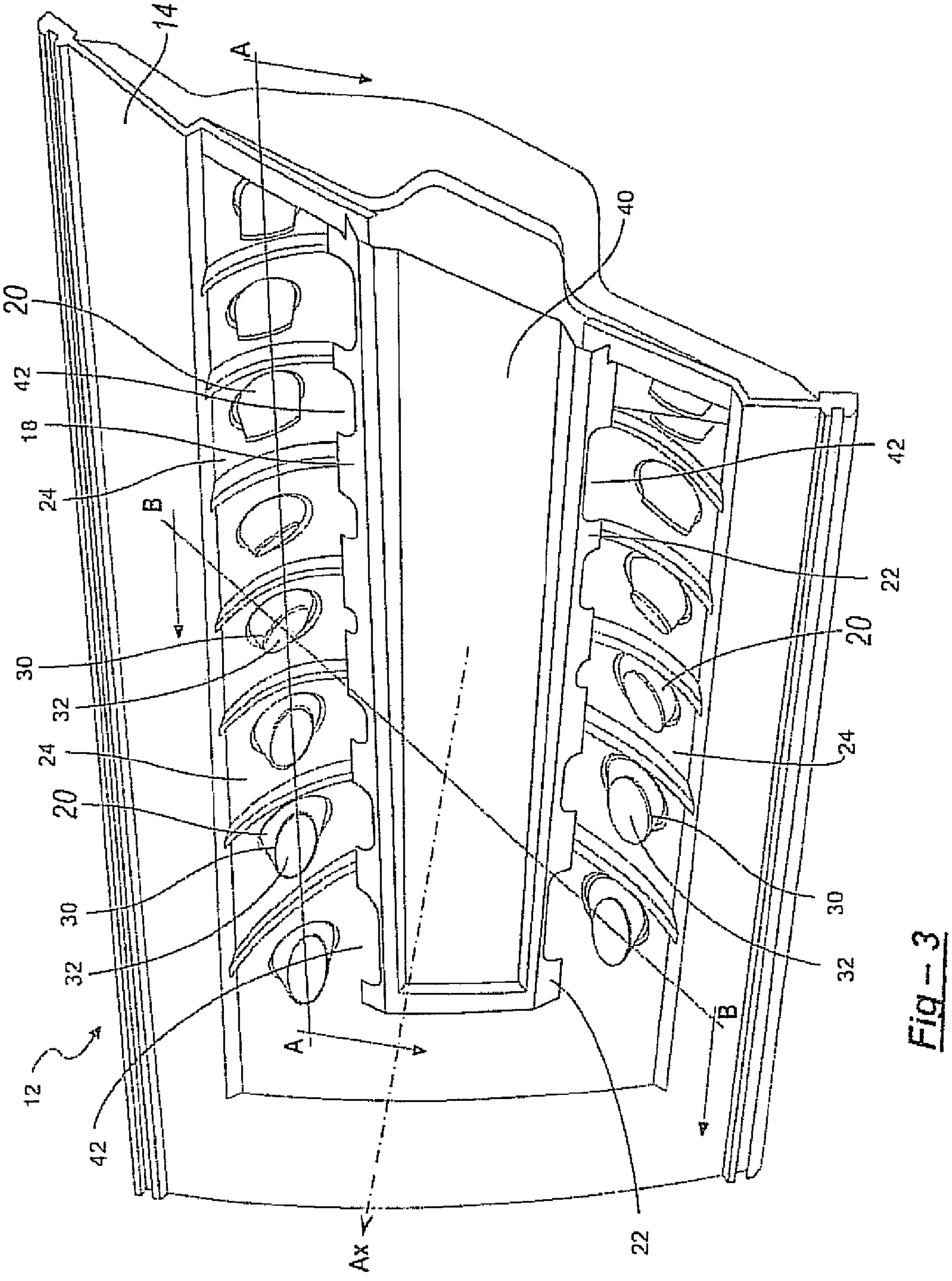
FIG. 3 is a three-dimensional front view of components of a vehicle lamp according to an embodiment of the invention.
Figure 4:
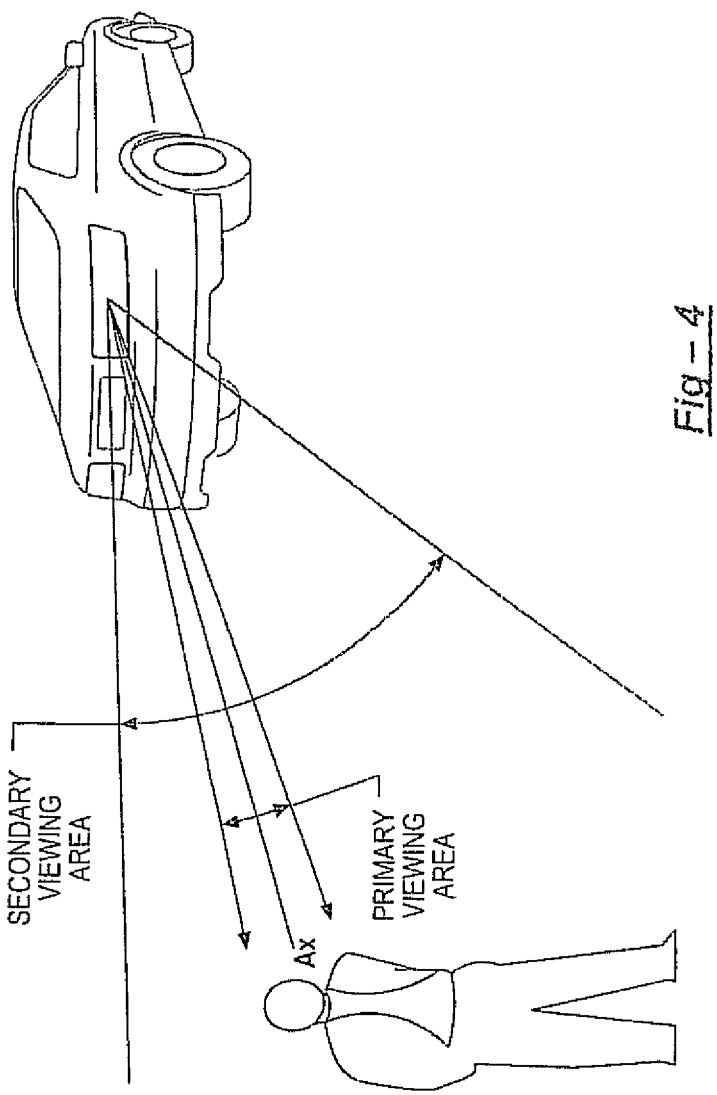
FIG. 4 depicts an exemplary lamp and exemplary viewing regions of the lamp according to an embodiment of the present invention.
Figure 5:
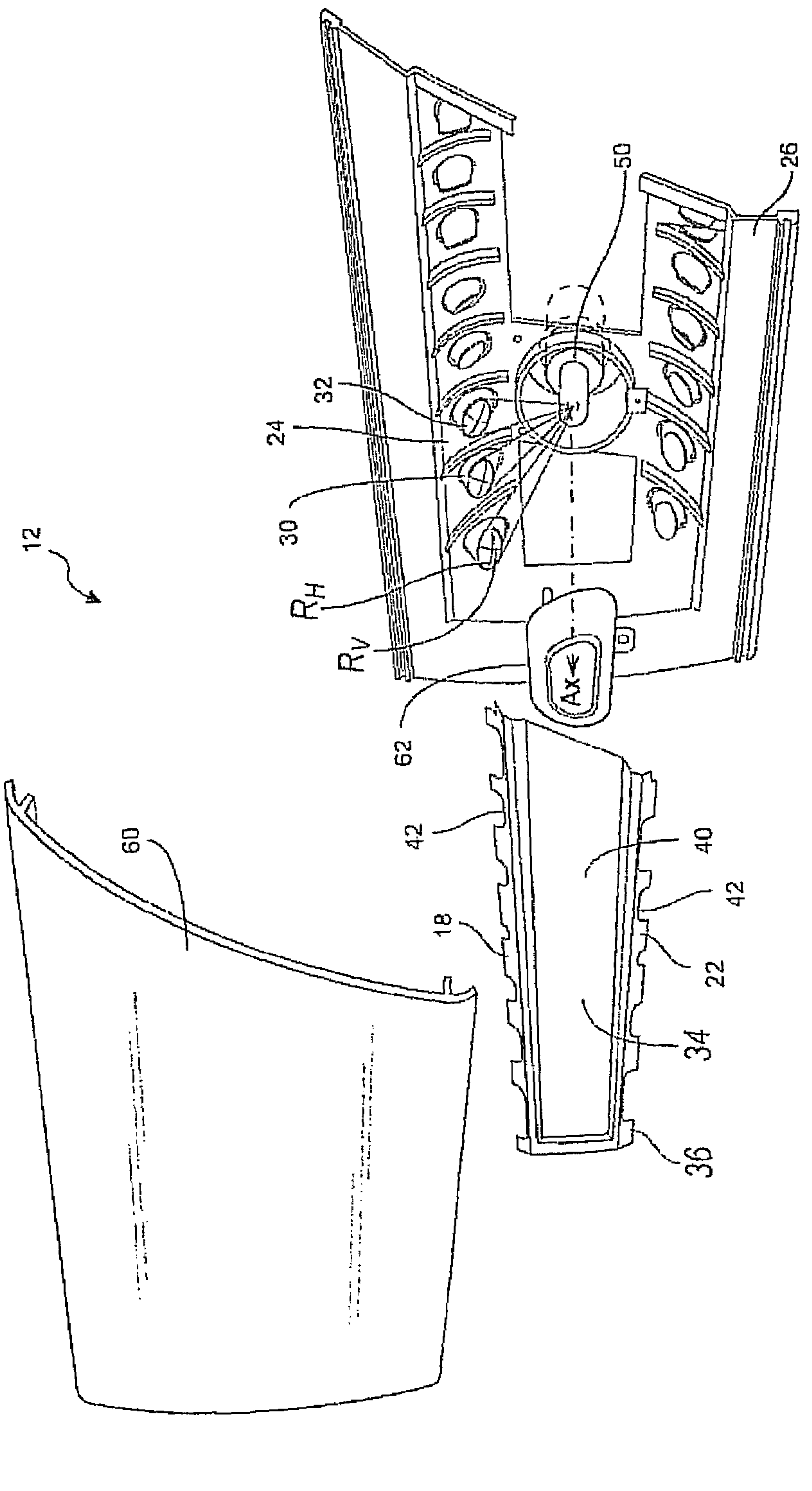
FIG. 5 illustrates an exploded view of components of a vehicle lamp from FIG. 3, according to an embodiment of this invention.
Figure 7B:
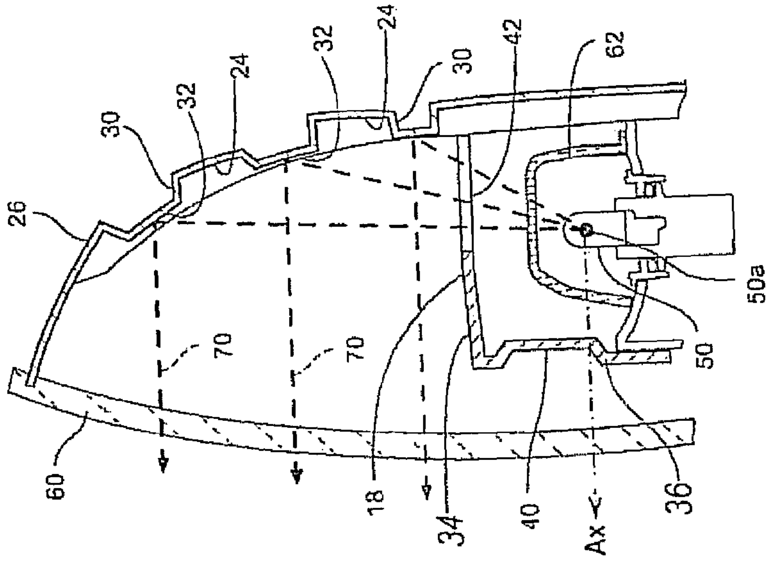
FIG. 7B illustrates a simplified sectional view of section of an alternative embodiment of the present invention shown from the side view and illustrating a ray trace.
Figure 7A:
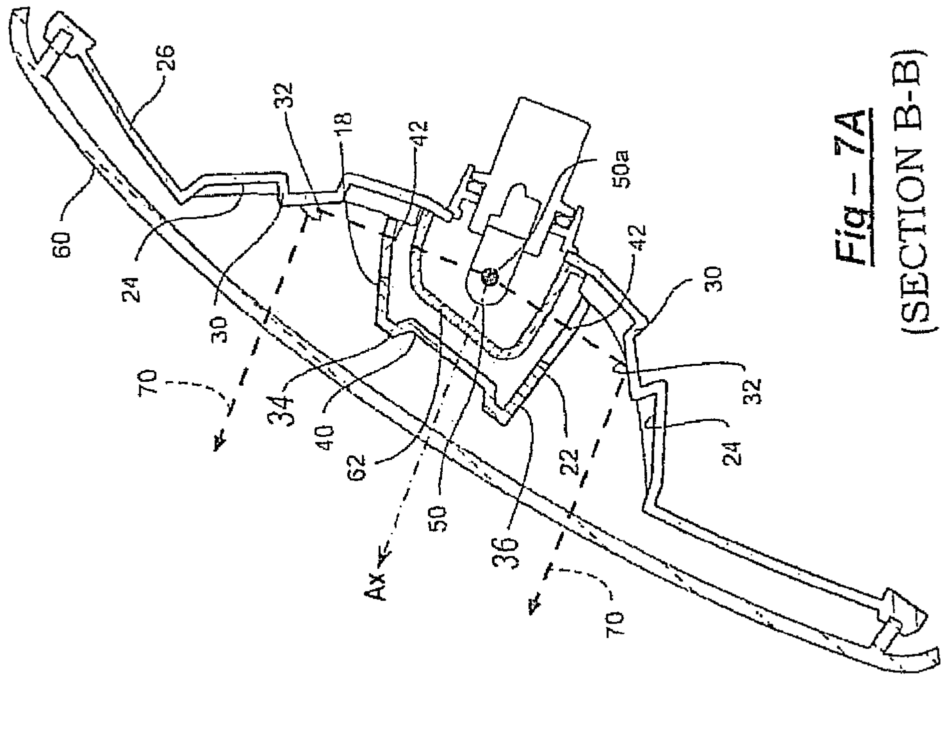
FIG. 7A illustrates a simplified sectional view of section B-B from FIG. 3 shown from the side view and illustrating a ray trace.

FIG. 7A is a section along section B-B of FIG. 3 showing the side elevation view of the lamp assembly 12 of an embodiment of the present invention. The side section view further illustrates that light projected from the light source 50 toward the viewing region may be blocked by the shield 40. The shield 40 also hides the light source 50 from view in the primary viewing direction. By hiding the light source 50 from view, the shield 40 may prevent any direct light from being emitted toward the primary viewing direction. Any light projected toward the primary viewing direction from the light source 50 may be indirect light which is reflected from the reflectors 30 and their corresponding reflective surfaces 32.

The light source 50 may be an incandescent bulb with a filament 50*a* which is positioned in a lamp housing 26. Light from the filament 50*a* may be emitted in virtually all directions. While light from the light source 50 may pass through the transparent inner lens 62, the light may be blocked from the primary viewing direction by the shield 40. Direct light may be blocked by the shield face 34, and the openings 42 which may be incorporated on the side flanges 36.

The side flanges 36 may include the cut-outs or openings 42 through which light may be emitted toward the reflectors 30. As shown in FIG. 7A, light that is incident to the reflective surfaces 32 may be reflected to the primary viewing region. Indirect light may be projected from the reflective surfaces 32 as generally collimated light beams 40 which may be generally parallel to the optical axis Ax. FIG. 7B illustrates an alternative embodiment where the light source 50 may be located in a bottom portion of the housing 26.

Figure 10A:
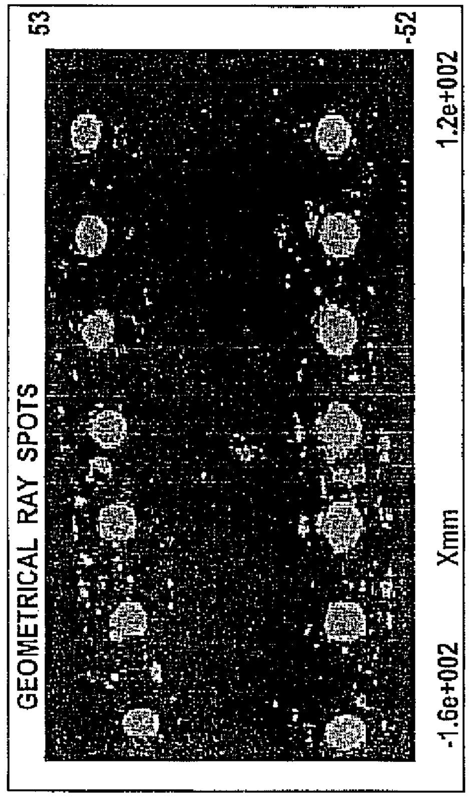
Figure 10B:
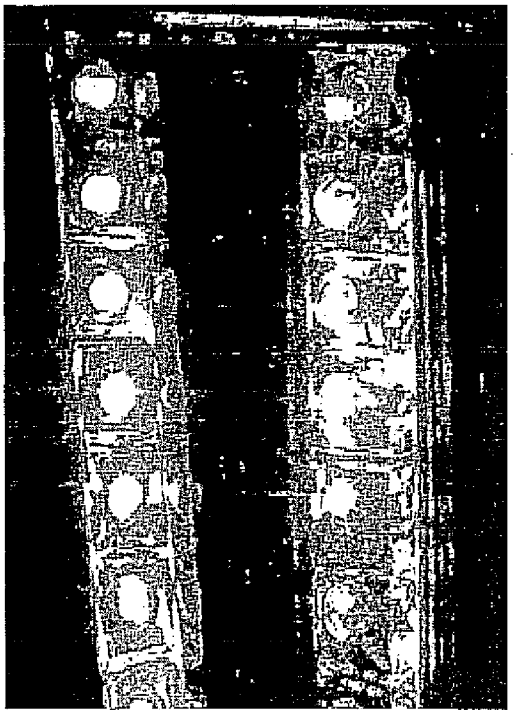

FIG. 10A and FIG. 10B depict the front views of a lamp assembly 12 of the present invention showing the distinct illuminated light sources observed from the primary viewing direction when the light source 50 of the vehicle lamp assembly 12 is on. In this example, the reflectors 30 are arranged in two substantially parallel rows spaced from each other. It is also contemplated that the reflectors 30 may be arranged in another array such as an oval or circular array depending on the aesthetic and style requirements of the lamp assembly 12.

FIG. 10A shows a computer simulated model depicting the front view of the lamp assembly 12 when the light source 50 of the vehicle lamp is on. In the computer simulation, the reflectors 30 appear as spots which depict the reflected image of the light source 50, and more specifically, the bulb filament 50*a* which is being reflected on the reflector 30. The spots simulate the reflectors 30 which are spaced apart by dark regions in between. The dark regions may simulate the connecting surfaces 24.

FIG. 10B depicts a prototype model of the present invention showing the front view of the lamp assembly 12 when the light source 50 of the vehicle lamp is on. The reflectors 30 appear as bright illuminated distinct light sources, whereas the connecting surfaces 24 appear dark or dim in relation. The reflectors 30 appear as distinct light sources, although the reflectors 30 may not all appear equally bright. Likewise, the connecting surfaces 24 appear dim or dark between the reflectors 30. The connecting surfaces may reflect some light to the primary viewing direction, however, the amount of light reflected by the connecting surfaces 24 may be relatively small compared to the intensity of the reflectors 30.

Embodiments of the present invention in FIG. 10A and FIG. 10B are shown as a tail lamp which is illuminated when the lights are turned on. It is also contemplated that the present invention may be included with a tail lamp including a stop function or a signal function in combination with the tail lamp. In this case, the light source may include a second filament which makes the reflectors appear brighter when the stop function is engaged. Likewise, the lamp may also include an additional light source which is illuminated when a stop or signal requirement is engaged.

Figure 11:
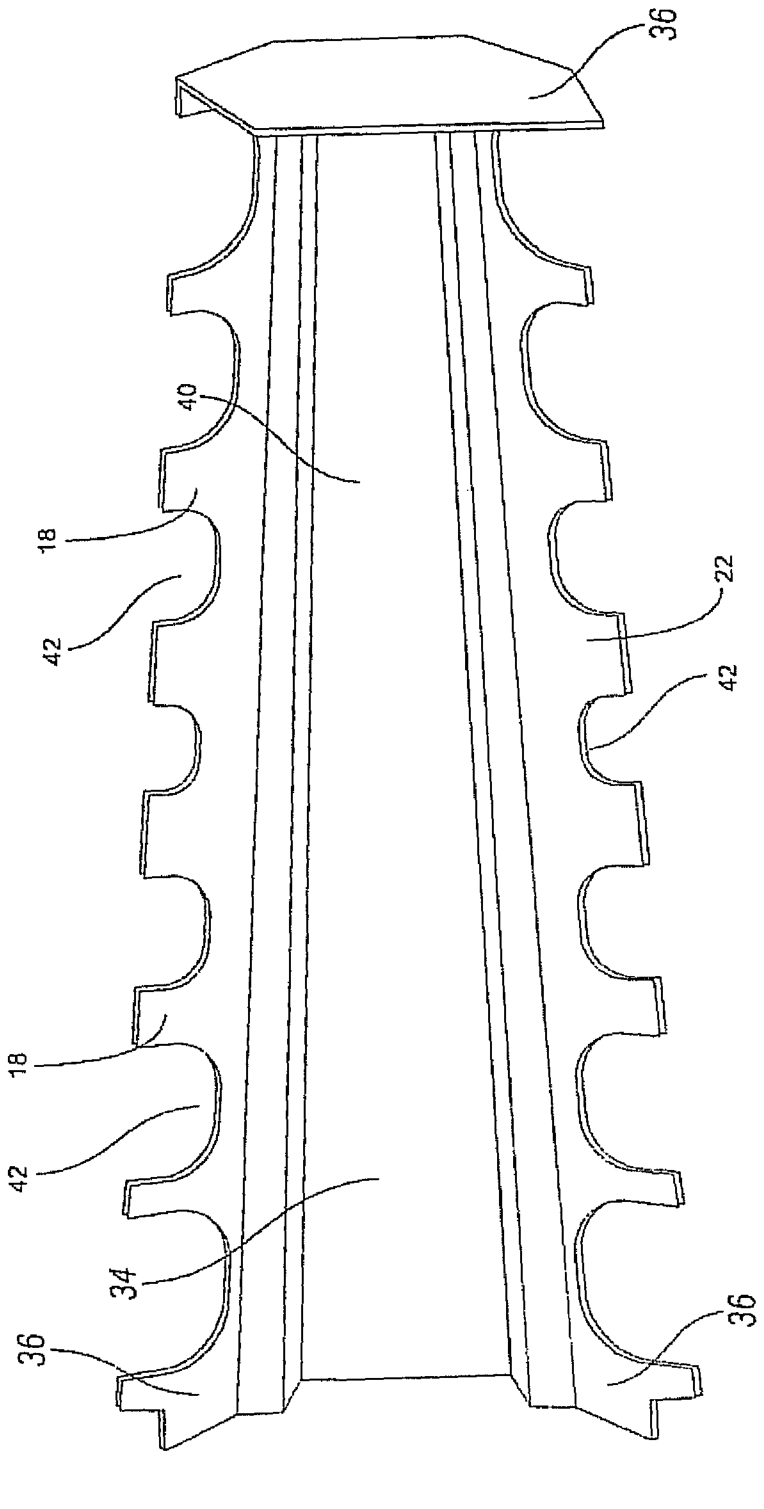
FIG. 11 illustrates a detailed view of the shield according to an embodiment of the present invention.

FIG. 11 is a detailed view of a shield 40 in accordance with one embodiment of the present invention. In particular, FIG. 11 depicts the back side of the shield 40, as viewed from the light source 50 when assembled. In at least one embodiment of the present invention, the shield 40 may include a plurality of cut-out regions or openings 42, where there may be at least one opening 42 that is formed to correspond to each reflector 30 for allowing light to project towards each reflector 30. This view further illustrates how the cut-out regions or openings 42 may vary depending on the location, orientation and distance from the light source 50 of the reflective surfaces 32. Each of the cut-out regions or openings 42 may be between 5 mm and 30 mm depending on the distance and orientation the reflector 30 is from the light source 50. However, depending on photometric requirements, the cut-out regions or openings 42 may be smaller, or even a continuous opening between the housing 26 and the shield 40. In addition to cut-out regions or openings 42, it is also contemplated that light from the light source 50 could be channeled to the reflectors 30 through reflectivity tunnels or light pipes. The light could also be projected from the light source 50 to the reflectors 30 using an additional set of reflectors on the shield 40.

Likewise, FIG. 11 further illustrates how the blocking regions 30 may vary in width depending on the location and orientation of the connecting surface 24 for which the blocking regions 18, 22 are blocking light from the light source 50 from projecting on the connecting surfaces 24. In one embodiment of the present invention, the width of blocking regions 18, 22 may vary between 2 mm to 10 mm. The blocking regions 18, 22 may decrease in width as the blocking region 18, 22 and corresponding connecting surface 24 are located further from the light source 50. In an alternative embodiment, the back side of the shield 40 includes a light absorbing material to prevent incident light. The light absorbing material may be a dark colored or blackened surface, either smooth or textured, to prevent incident light. As further shown in FIG. 11, the back side of the shield 40, in an embodiment of the invention, may not have optics or optical characteristics. However, in an alternate embodiment of the invention, it is contemplated that the back side of the shield 40 may include optic features to further direct the light to the reflectors 30.

The cut-out regions or openings 42 and blocking region 18, 22 may be formed on the side flange 36 of the shield 40. The side flange 36 may extend in a transverse direction from the periphery of the shield face 34 and may extend to abut the housing 26. In another embodiment of the present invention, the side flanges 36 may be formed in the housing 26 and extend to abut the shield 40. Likewise, the cut-out regions or openings 42 and blocking regions 18, 22 may be formed in the housing 26 and cooperate with the shield 40 to block light from the light source 50.

Figure 12:
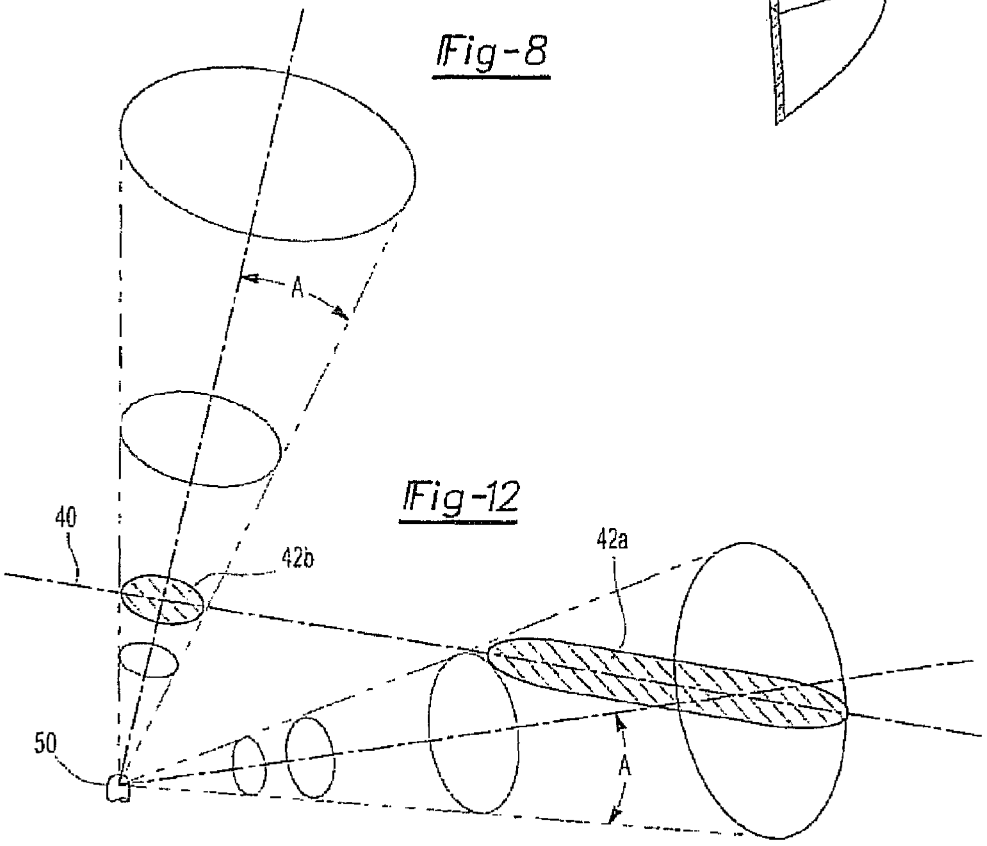
FIG. 12 illustrates light through the openings showing equal light intensity.
Figure 9:
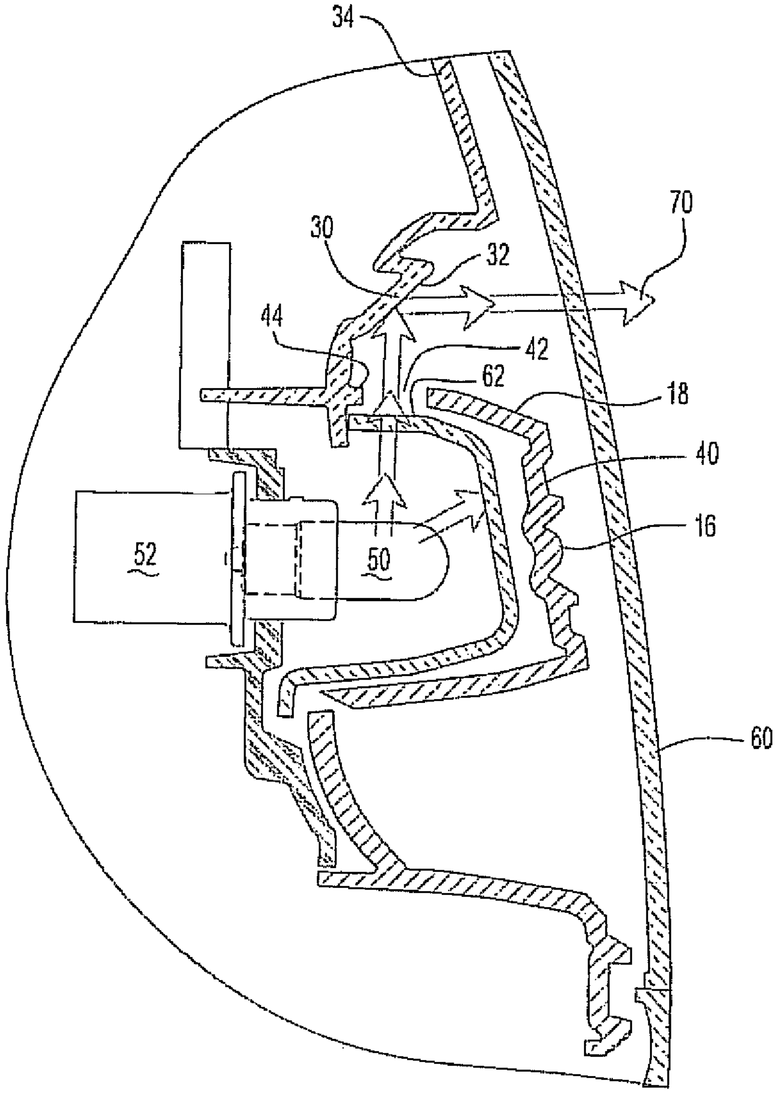
FIG. 9 is a cross-sectional view along section 3-3 of FIG. 2 depicting a rear automotive lamp assembly including the ability of replicating the look of a plurality of distinct illumination sources.

As illustrated in FIG. 12, light from the light source 50 emits beams of light selectively passable through the openings 42. The openings 42 vary in size and dimension along the length of the shield 40. As shown by FIG. 3, the openings 42 disposed closer to the light source 50 are smaller in dimension as compared to the openings 42 positioned away from the light source 50. The openings 42 gradually increase in dimension as the openings move farther away from the light source 50 to allow for equal light intensity shining on and reflecting off of the respective reflective surfaces 32. A larger opening 42*a* allows more light to pass through the opening 42*a* to ensure equal intensity of light shining on each reflective surface 32. Accordingly, the smaller opening 42*b* allows less light to pass through the opening 42*b* to ensure equal light intensity output as viewed by a viewer, as shown in FIG. 12. The openings 42 are adjusted in size and dimension allowing the light emitted from the light source 50 to output equal intensities thereby creating a uniform plurality of light reflection points 14 have relatively equal measured intensities. The intensity of each output from light source 50 through each respective opening 42*a*, 42*b* is equal as evidenced by angle A shown in FIG. 12. Angle A, for each light output, is equal due to the varying dimensions of the openings 42. Angle A ranges between 3° and 10°.

It is also to be understood that, although the foregoing description and drawings describe and illustrate in detail working embodiments of the present invention, to those skilled in the art to which the present invention relates, the present disclosure will suggest many modifications and embodiments. The present invention, therefore, is intended to be limited only by the scope of the appended claims and the applicable prior art.

We claim:

1. An automotive lamp assembly replicating the appearance of a plurality of light emitting diodes, the lamp assembly comprising:

a light source;

at least one reflector, the at least one reflector having a reflective surface, the reflective surface operable to reflect light from the light source, the at least one reflector being spaced apart and oriented such that light rays from the light source are incident to each of the reflective surfaces is reflected towards a viewing direction; and a shield, the shield including a plurality of open sections disposed between the light source and the reflective surface of the reflector thereby allowing a plurality of light beams from the light source to shine on the reflective surface such that each of the reflective surfaces of the at least one reflector appears as a distinct illumination source from the viewing direction.

2. The automotive lamp assembly of claim 1, wherein the plurality of open sections are generally semicircular.

3. The automotive lamp assembly of claim 1, wherein an inner lens is provided between an incandescent light bulb and the reflective surface.

4. The automotive lamp assembly of claim 1, wherein each of the reflective surfaces is oriented such that the reflective surface is defined by a raised parabolic section creating higher illuminance.

5. The automotive lamp assembly of claim 4, wherein the optical axes of each of the reference parabolic sections are generally coincident and the light source is generally located on the optical axis of the reference parabolic sections.

6. The automotive lamp assembly of claim 5, wherein the light source is generally located at the focal point of the parabolic sections.

7. The automotive lamp assembly of claim 1, wherein the each of the reflectors is spaced apart from another of the reflectors by at least the width of the reflective surface.

8. The automotive lamp assembly of claim 7, wherein the area defining the spaced apart reflectors has a low reflectivity to scatter the light to prevent the light from focusing to the primary viewing direction.

9. The automotive lamp assembly of claim 1, where the open sections of the shield vary in dimension providing the open sections closer to the light source smaller in dimension and the open sections further away from the light source larger in dimension respective to the smaller open section.

10. The automotive lamp assembly of claim 1, wherein a backside of the shield provides a light absorbing material.

11. The automotive lamp assembly of claim 1, wherein each of the reflective surfaces further includes a curved surface such that the generally collimated light beams have an angular spread so that the light beams are visible from a range of viewing angles.

12. The automotive lamp assembly of claim 1, wherein the light source is hidden from the viewing direction by the shield.

13. The automotive lamp assembly of claim 1, further including a plurality of connecting surfaces disposed between the plurality of reflectors wherein the shield is further configured to block light from the light source to the plurality of connecting surfaces.

14. The automotive lamp assembly of claim 1, wherein the light reflected from each of the plurality of reflectors is relative uniform intensity in the viewing direction.

15. The automotive lamp assembly of claim 1, wherein a first one of the reflective surfaces is spaced further from the optical axis than a second one of the reflective surfaces, the second reflective surface having a surface area generally larger than the first reflective surface.

16. The automotive lamp assembly of claim 15, wherein each of plurality of reflective surfaces appear generally equal in size from the viewing direction.

17. The automotive lamp assembly of claim 1, further including a plurality of connecting surfaces disposed between the plurality of reflectors wherein each of the reflectors is a raised element such that each of the reflectors is a protuberance from the adjacent connecting surface.

18. The automotive lamp assembly of claim 17, where the open sections of the shield define a plurality of blocking regions to prevent direct light from the light source from hitting the connecting surfaces.

19. The automotive lamp assembly of claim 1, wherein the light source is an incandescent light bulb.

20. A method of operating a lamp for a vehicle comprising:

providing a light source;

blocking light by means of a shield from the light source from a viewing direction;

directing light by means of an open section in the shield from the light source towards a plurality of reflectors; and reflecting light from the light source off of a plurality of reflectors such that light from the light source which reflected by the reflectors is reflected toward the viewing direction, wherein each of the reflectors appear as a distinct illumination source from the viewing direction.

* * * * *

UNITED STATES PATENT AND TRADEMARK OFFICE

CERTIFICATE OF CORRECTION

PATENT NO. : 8,562,190 B2
APPLICATION NO. : 12/981957
DATED : October 22, 2013
INVENTOR(S) : Michal Ostrowski et al.

It is certified that error appears in the above-identified patent and that said Letters Patent is hereby corrected as shown below:

On The Title Page

(75) Delete "Yijung Zhu", Insert --Yijing Zhu--

Signed and Sealed this
Fifth Day of May, 2015

Michelle K. Lee
*Director of the United States Patent and Trademark Office*

UNITED STATES PATENT AND TRADEMARK OFFICE

CERTIFICATE OF CORRECTION

PATENT NO. : 8,562,190 B2
APPLICATION NO. : 12/981957
DATED : October 22, 2013
INVENTOR(S) : Ostrowski et al.

It is certified that error appears in the above-identified patent and that said Letters Patent is hereby corrected as shown below:

Title Page,
Item [75], Inventors, "Yijing Zhu" (as corrected to read in the Certificate of Correction issued May 5, 2015) is deleted and patent is returned to its original state with fourth inventor first name in patent to read -- Yijung Zhu --.

Signed and Sealed this
Seventh Day of July, 2015

Michelle K. Lee
*Director of the United States Patent and Trademark Office*

UNITED STATES PATENT AND TRADEMARK OFFICE

CERTIFICATE OF CORRECTION

PATENT NO. : 8,562,190 B2
APPLICATION NO. : 12/981957
DATED : October 22, 2013
INVENTOR(S) : Ostrowski et al.

It is certified that error appears in the above-identified patent and that said Letters Patent is hereby corrected as shown below:

Title Page, Item (75) Inventor is corrected to read:
-- Michal Ostrowski, Tipton, MI (US);
Dianna Stadtherr, Novi, MI (US);
Manish Sharma, Farmington Hills, MI (US);
Yijing Zhu, Windsor (CA) --.

Signed and Sealed this
Ninth Day of August, 2016

Michelle K. Lee

Michelle K. Lee
*Director of the United States Patent and Trademark Office*